US012717794B1

(12) United States Patent
Mohammed et al.

(10) Patent No.: US 12,717,794 B1
(45) Date of Patent: Aug. 25, 2026

(54) ORCHESTRATING PERFORMANCE OF ASYNCHRONOUS DATABASE TASKS

(71) Applicant: Amazon Technologies, Inc., Seattle, WA (US)

(72) Inventors: Junaid Azad Mohammed, Kirkland, WA (US); James Alexander Morle, Dripping Springs, TX (US); Amol Saxena, Seattle, WA (US); Gourav Roy, Redmond, WA (US); Matthys Strydom, Kirkland, WA (US); Vishwas Karthiveerya, Sudio City, CA (US); Joshua Gordon Williams, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/621,901

(22) Filed: Mar. 29, 2024

(51) Int. Cl.

| | |
|---|---|
| ***G06F 16/20*** | (2019.01) |
| ***G06F 11/34*** | (2006.01) |
| ***G06F 16/245*** | (2019.01) |
| ***G06F 16/25*** | (2019.01) |

(52) U.S. Cl.
CPC .... *G06F 16/24569* (2019.01); *G06F 11/3433* (2013.01); *G06F 11/3442* (2013.01); *G06F 16/256* (2019.01)

(58) Field of Classification Search
CPC ............. G06F 16/24569; G06F 16/256; G06F 11/3433; G06F 11/3442
See application file for complete search history.

(56) References Cited

U.S. PATENT DOCUMENTS

| | | | | |
|---|---|---|---|---|
| 9,799,017 | B1 * | 10/2017 | Vermeulen | G06F 16/285 |
| 10,025,802 | B2 * | 7/2018 | Vermeulen | G06F 16/21 |
| 10,373,247 | B2 * | 8/2019 | Vermeulen | G06Q 40/00 |
| 10,860,612 | B2 | 12/2020 | Lee et al. | |
| 11,157,854 | B2 | 10/2021 | Tran et al. | |
| 11,386,058 | B2 | 7/2022 | Hung et al. | |
| 11,397,709 | B2 * | 7/2022 | Vermeulen | G06F 16/21 |
| 11,625,700 | B2 * | 4/2023 | Vermeulen | G06F 16/285 707/703 |
| 2016/0070589 | A1 * | 3/2016 | Vermeulen | G06F 9/466 711/153 |
| 2016/0085772 | A1 * | 3/2016 | Vermeulen | G06F 16/21 707/615 |
| 2016/0086260 | A1 * | 3/2016 | Vermeulen | G06Q 40/00 705/35 |
| 2018/0019985 | A1 * | 1/2018 | Schoof | H04L 9/3242 |
| 2018/0047002 | A1 * | 2/2018 | Vermeulen | G06F 16/25 |
| 2018/0322149 | A1 * | 11/2018 | Vermeulen | G06F 16/21 |
| 2019/0102411 | A1 * | 4/2019 | Hung | G06F 16/21 |
| 2021/0084031 | A1 * | 3/2021 | Lao | H04L 63/0846 |

FOREIGN PATENT DOCUMENTS

WO WO2016044763 A1 * 3/2016

* cited by examiner

*Primary Examiner* — Daniel A Kuddus
(74) *Attorney, Agent, or Firm* — S. Scott Foster; Kowert, Hood, Munyon, Rankin & Goetzel, P.C.

(57) ABSTRACT

A request that causes an asynchronous task is received at a database system. The database system performs the asynchronous task by recognizing that the request causes an asynchronous task, performs a write to a system table that records the asynchronous task for perform, detects, by a listener for asynchronous tasks, the write to the system table, and coordinates performance of the asynchronous task by a different request processor of the database system that is provisioned to perform the asynchronous task.

20 Claims, 10 Drawing Sheets

ORCHESTRATING PERFORMANCE OF ASYNCHRONOUS DATABASE TASKS

BACKGROUND

Commoditization of computer hardware and software components has led to the rise of service providers that provide computational and storage capacity as a service. At least some of these services, such as database services, are implemented in distributed fashion in order to provide durability and availability of data. In this way, workloads for client applications can be distributed amongst multiple components of a distributed database system in order to provide consistent performance.

Figure 1:
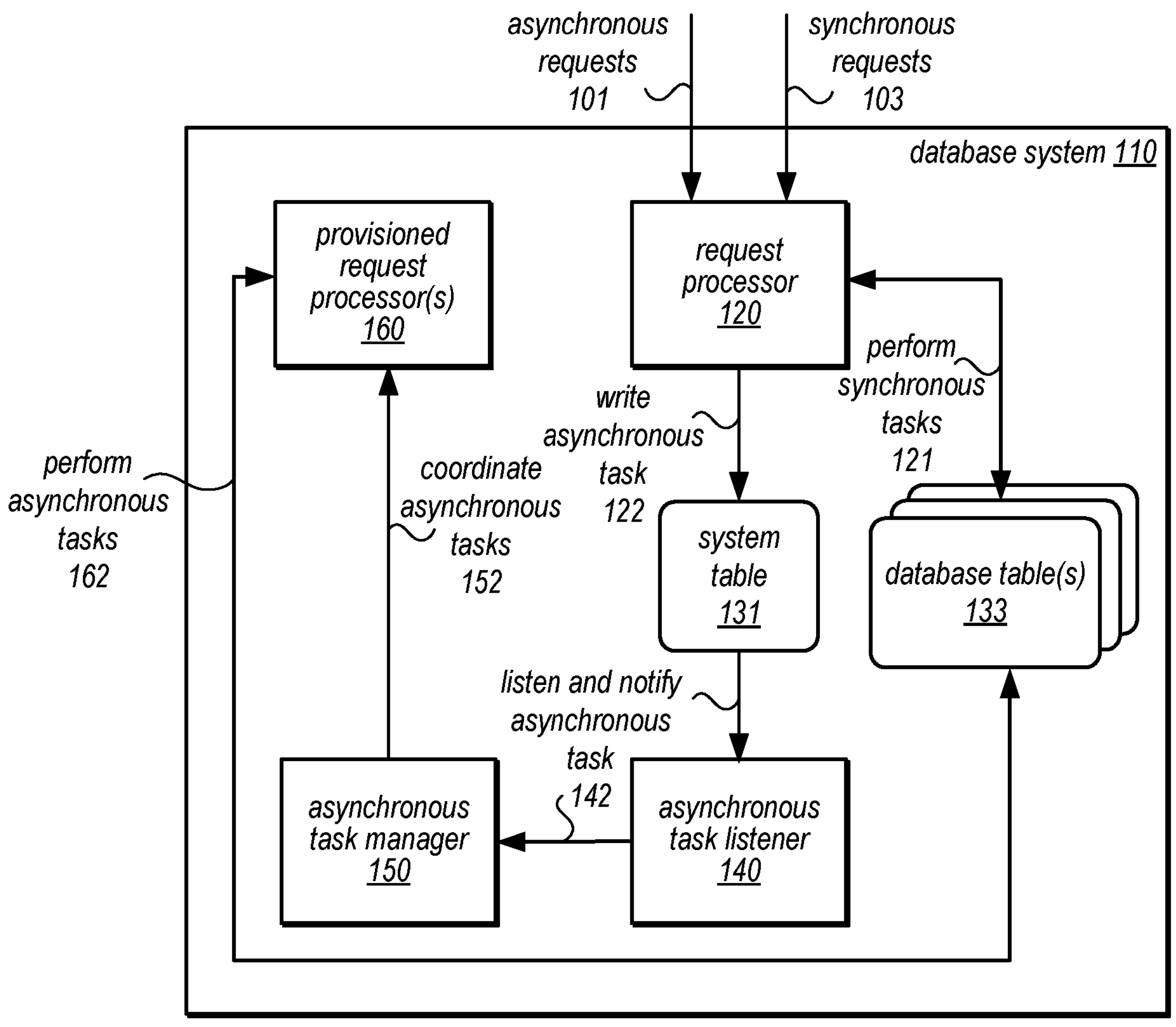
FIG. 1 is a logical block diagram illustrating orchestrating performance of asynchronous database tasks, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Database systems support different types of requests to reconfigure or optimize performance of a database. For example, Data Definition Language (DDL) requests may be performed which alter a table to add columns, modify table schema, or otherwise change the data that has to be stored. Similarly, some types of requests to add new data structures (e.g., secondary indexes), drop or delete data, or various other requests may cause tasks that are performed asynchronously (e.g., where the task is performed over a long period of time and/or does not have a client application that is waiting on a response to return). In order to perform these tasks without interfering with other tasks (e.g., synchronous tasks, such as queries or transactions), database systems may implement orchestrating performance of asynchronous database tasks to improve overall database system performance. As one of ordinary skill in the art may appreciate, improving the performance of asynchronous tasks without interfering with synchronous tasks, will improve the performance of database systems, client applications that rely upon database systems and computer-related technologies more generally. Moreover, techniques that implement orchestrating performance of asynchronous database tasks can provide consistent performance (e.g., consistent latency for long-running tasks), allowing applications or other reliant systems on the results of these tasks (including database systems) to efficiently schedule other work or determine actual resource requirements to complete such tasks.

FIG. 1 is a logical block diagram illustrating orchestrating performance of asynchronous database tasks, according to some embodiments. In FIG. 1, database system 110 may be a stand-alone database system (e.g., implemented on private network systems or services or implemented by a user of a cloud or other provider network, like the provider network discussed in detail below with regard to FIG. 2). In some embodiments, database system 110 may be database service, like database service 210 discussed in detail below with regard to FIGS. 2-7, which may be implemented and managed by a provider network. Database system 110 may be one of many different types of database, including types that support different kinds of access to database data, such as through the use of a query language like Structured Query Language (SQL) or APIs or other commands that provide access. Different types of databases may store data for the database in different formats and according to different data models. For instance, one type of database may use a relational data model that imposes a common schema for a table of the relational database and another type of database may use a non-relational data model that imposes a flexible schema, which may not be common across different items or objects in the database. Databases may store various types of data including, but not limited to, graph databases storing data using a graph data model, time series databases storing time series data, key-value database that use a unique key-value to lookup data objects of various data types or formats in the database, or document databases that store data as a document with varying attributes, including nested data.

Database system 110 may store database data in a storage system, such as database tables. In some embodiments, a non-distributed storage system may be implemented to store a database. In other embodiments, the database may be stored in a distributed data storage system, such as storage service 220 discussed below with regard to FIGS. 2-5. A synchronous request 103 may be performed by request processor 120, as indicated at 121 with respect to database tables 133. A synchronous request 103 may include various requests such as requests that wait upon an acknowledgement or response indicating completion (e.g., a query or other read request (e.g., a get request), transactions (including reads and/or writes, or other writes, such as requests to insert, add, put, modify, change, remove, or delete). Although database table(s) 133 are depicted, other arrangements, structures, or data models may be implemented (e.g., collections, documents, graphs, or other forms which may correspond to various types of database systems, such as those mentioned above).

When an asynchronous request is received, 101, techniques may be implemented to orchestrate performance so that request processor 120 is not interfered with or slowed down to perform the asynchronous requests 101. Asynchronous requests 101 may include various requests that are explicitly asynchronous (e.g., requests for which no acknowledgement or response is expected by a client submitting the request) or implicitly asynchronous (e.g., an acknowledgement may be sent but it may not indicate completion of the asynchronous task). Examples of asynchronous tasks may include, but are not limited to, DDL requests which alter a table to add columns, modify table schema, or otherwise change the data that has to be stored, add new data structures (e.g., secondary indexes), drop or delete data, or various other requests may cause tasks that are performed asynchronously (e.g., where the task is performed over a long period of time and/or does not have a client application that is waiting on a response to return).

To initiate orchestration, the asynchronous task may be written 122 to system table 131. System table 131 may be an application level table (like a table written to by a client application), or may be a system level table (hidden and/or specially managed by database system 110 that is not accessible to clients). Writing to system table 131 may be performed directly as depicted in FIG. 1 or using one or various coordination/replication techniques, as discussed in detail below with regard to FIGS. 2-5. Asynchronous task listener 140 may listen and notify 142 asynchronous task manager 150. Asynchronous task manager 152 can coordinate asynchronous task performance at provisioned request processors 160, which may perform 162 the asynchronous tasks with respect to database tables 133., as discussed in detail below with regard to FIGS. 6-9.

Please note, FIG. 1 is provided as a logical illustration of a database system and its respective components, as well as respective interactions and is not intended to be limiting as to the physical arrangement, size, or number of components or devices to implement such features. Additional multiple components may be involved, distributing the responsibilities of a database system 110 across multiple components (e.g., a query processor, adjudicator, and so on as illustrated below with regard to FIGS. 3-5).

The specification continues with an example network-based database service implemented as part of a provider network that performs orchestrating performance of asynchronous database tasks. Included in the description of the example database service are various aspects of the example database service, such as a database instance, and a separate storage service. The specification then describes flowcharts of various embodiments of methods for orchestrating performance of asynchronous database tasks. Next, the specification describes an example system that may implement the disclosed techniques. Various examples are provided throughout the specification.

Figure 2:
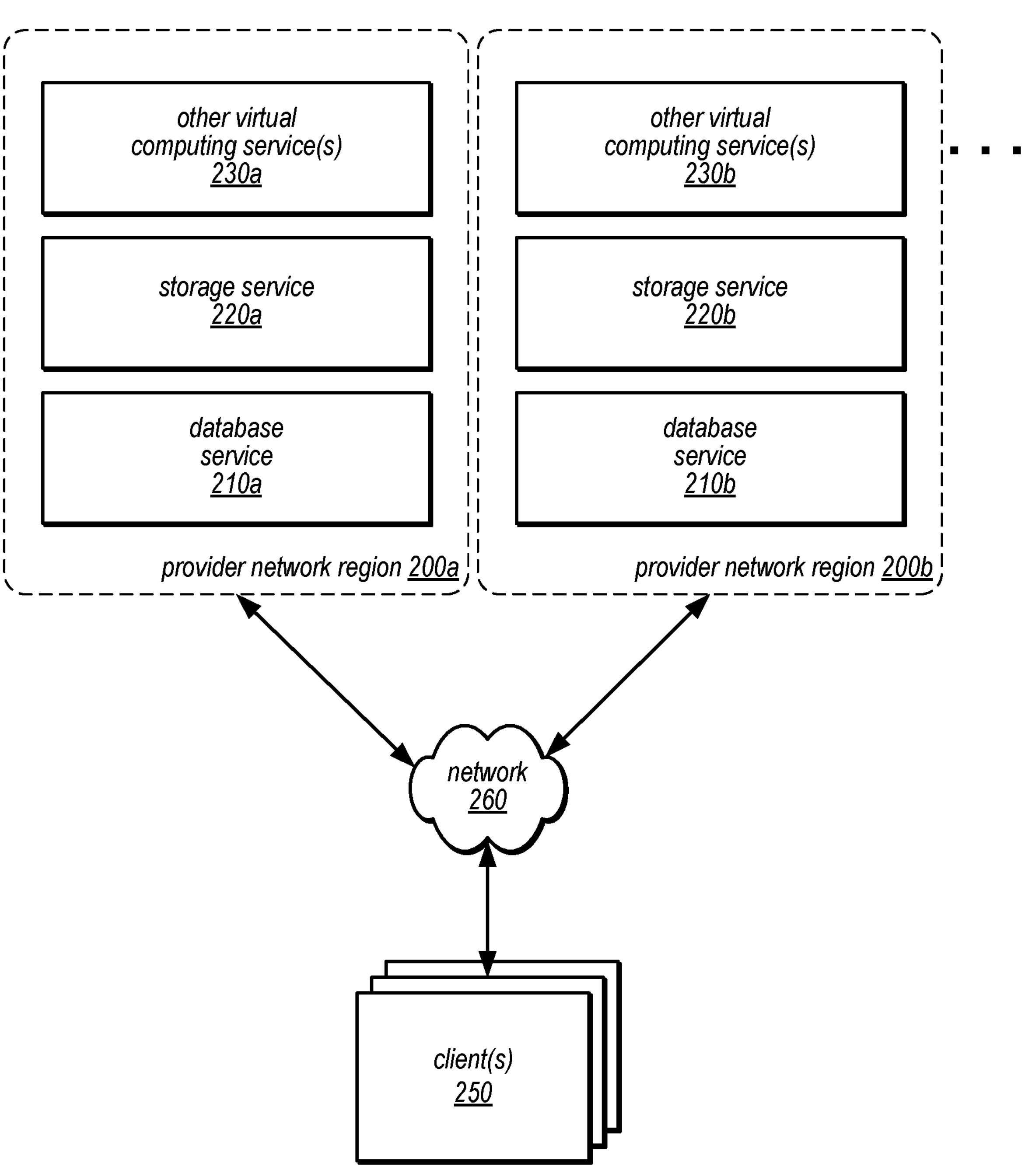
FIG. 2 is a block diagram illustrating provider network regions that may implement a database service that implement techniques orchestrating performance of asynchronous database tasks, according to some embodiments.

FIG. 2 is a block diagram illustrating provider network regions that may implement a database service that implement techniques orchestrating performance of asynchronous database tasks, according to some embodiments. A provider network (sometimes referred to as a "cloud provider network" or "cloud") refers to a pool of network-accessible computing resources (such as compute, storage, and networking resources, applications, and services), which may be virtualized or bare-metal. The provider network can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Users can connect to availability zones of the provider network via a publicly accessible network (e.g., the Internet, a cellular communication network) by way of a transit center (TC). TCs can be considered as the primary backbone locations linking users to the provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The provider network may deliver content from points of presence outside of, but networked with, these regions by way of edge locations and regional edge cache servers (points of presence, or PoPs). This compartmentalization and geographic distribution of computing hardware enables the provider network to provide low-latency resource access to users on a global scale with a high degree of fault tolerance and stability.

The provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the provider network, which may be provisioned in user accounts.

The traffic and operations of the provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

As depicted in FIG. 2, an exemplary provider network may include numerous provider network regions 220*a*, 220*b*, and so on that may include one or more data centers hosting various resource pools, such as collections of physical and/or virtualized computer servers, storage devices, networking equipment and the like (e.g., computing system 1000 described below with regard to FIG. 10), needed to implement and distribute the infrastructure and storage services offered by the provider network within the provider network regions 200.

In the illustrated embodiment, a number of clients (shown as clients 250 may interact with a provider network 200 via a network 260. Provider network may implement respective instantiations of the same (or different) services, a database service 210*a* for region 200*a* and database service 210*b* for region 200*b*, a storage service 220*a* for region 200*a* and storage service 220*b* for region 220*b*, as well as various other virtual computing services 230*a* and 230*b* respectively. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to one or more of provider network regions 200*a* or 200*b* via network 260, including requests for database services. For example, a given client 250 may include a suitable version of a web browser, or may include a plug-in module or other type of code module may execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with service of a region of a provider network. In some embodiments, client 250 may generate network-based services requests according to a Representational State Transfer (REST)-style web services architecture, a document- or message-based network-based services architecture, or another suitable network-based services architecture. Although not illustrated, some clients of provider network 200 services may be implemented within a service of the provider network (e.g., a client application of database service 210*a* may be implemented on one of other virtual computing service(s) 230*a* in region 200*a*), in some embodiments. Therefore, various examples of the interactions discussed with regard to clients 250 may be implemented for internal clients as well, in some embodiments.

In some embodiments, a client 250 (e.g., a database service client) may be may provide access to network-based storage of database data to other applications in a manner that is transparent to those applications. For example, client 250 may be may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model, as described above. Instead, the details of interfacing to the provider network may be coordinated by client 250 and the operating system or file system on behalf of applications executing within the operating system environment.

Clients 250 may convey network-based services requests to and receive responses from a region of the provider network via network 260. In various embodiments, network 260 may encompass any suitable combination of networking hardware and protocols necessary to establish network-based communications between clients 250 and provider network regions 200*a* and 200*b*. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and the provider network region may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network regions 200*a* and 200*b*. It is noted that in some embodiments, clients 250 may communicate with regions of a provider network using a private network rather than the public Internet. For example, clients 250 may be provisioned within the same enterprise as a database service. In such a case, clients 250 may communicate with a provider network region entirely through a private network 260 (e.g., a LAN or WAN that may use Internet-based communication protocols but which is not publicly accessible).

Generally speaking, provider network regions 200*a* and 200*b* may implement one or more service endpoints may receive and process network-based services requests, such as requests to access a database (e.g., queries, inserts, updates, etc.) and/or manage a database (e.g., create a database, configure a database, etc.). For example, a provider network region may include hardware and/or software may implement a particular endpoint, such that an HTTP-based network-based services request directed to that endpoint is properly received and processed. In one embodiment, a provider network region may be implemented as a server system may receive network-based services requests from clients 250 and to forward them to components of a system that implements database service 210*a* or 210*b*, storage service 220*a* or 220*b* and/or another virtual computing service 230*a* or 230*b* for processing. In other embodiments, provider network region may be configured as a number of distinct systems (e.g., in a cluster topology) implementing load balancing and other request management features may dynamically manage large-scale network-based services request processing loads. In various embodiments, a provider network region may be may support REST-style or document-based (e.g., SOAP-based) types of network-based services requests.

In addition to functioning as an addressable endpoint for clients' network-based services requests, in some embodiments, a provider network region may implement various client management features. For example, provider network region 200*a* may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Provider network regions may also implement financial accounting and billing systems, or may maintain a database of usage data that may be queried and processed by external systems for reporting and billing of client usage activity. In certain embodiments, provider network regions may collect, monitor and/or aggregate a variety of storage service system operational metrics, such as metrics reflecting the rates and types of requests received from clients 250, bandwidth utilized by such requests, system processing latency for such requests, system component utilization, such as the target capacity determined for individual database engine head node instances, network bandwidth and/or storage utilization, rates and types of errors resulting from requests, characteristics of stored and databases (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210*a* or 210*b*, storage service 220*a* or 220*b* and/or another virtual computing service 230*a* or 230*b* (or the underlying systems that implement those services).

In some embodiments, provider network regions may also implement user authentication and access control procedures. For example, for a given network-based services request to access a particular database table, a provider network region ascertain whether the client 250 associated with the request is authorized to access the particular database table. Provider network regions may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, the provider network region may reject the corresponding network-based services request, for example by returning a response to the requesting client 250 indicating an error condition. Various access control policies may be stored as records or lists of access control information by database services 210*a* or 210*b*, storage services 220*a* or 220*b* and/or other virtual computing services 230*a* or 230*b*.

Note that in many of the examples described herein, services, like database service or storage service may be internal to a computing system or an enterprise system that provides database services to clients 250, and may not be exposed to external clients (e.g., users or client applications). In such embodiments, the internal "client" (e.g., database service 210*a*) may access storage service 220*a* over a local or private network (e.g., through an API directly between the systems that implement these services). In such embodiments, the use of storage service 220*a* in storing database tables on behalf of clients 250 may be transparent to those clients. In other embodiments, storage services 220*a* or 220*b* may be exposed to clients 250 through provider network region 200*a* or 200*b* to provide storage of database tables or other information for applications other than those that rely on database service 210*a* or 210*b* for database management. In such embodiments, clients of the storage service 220*a* or 220*b* may access storage service 220*a* or 220*b* via network 260 (e.g., over the Internet). In some embodiments, a virtual computing service 230*a* or 230*b* may receive or use data from storage service 220*a* or 220*b* (e.g., through an API directly between the virtual computing service 230*a* or 230*b* and storage service 220*a* or 220*b*) to store objects used in performing computing services 230*a* or 230*b* on behalf of a client 250. In some cases, the accounting and/or credentialing services of provider network region may be unnecessary for internal clients such as administrative clients or between service components within the same enterprise.

Figure 3:
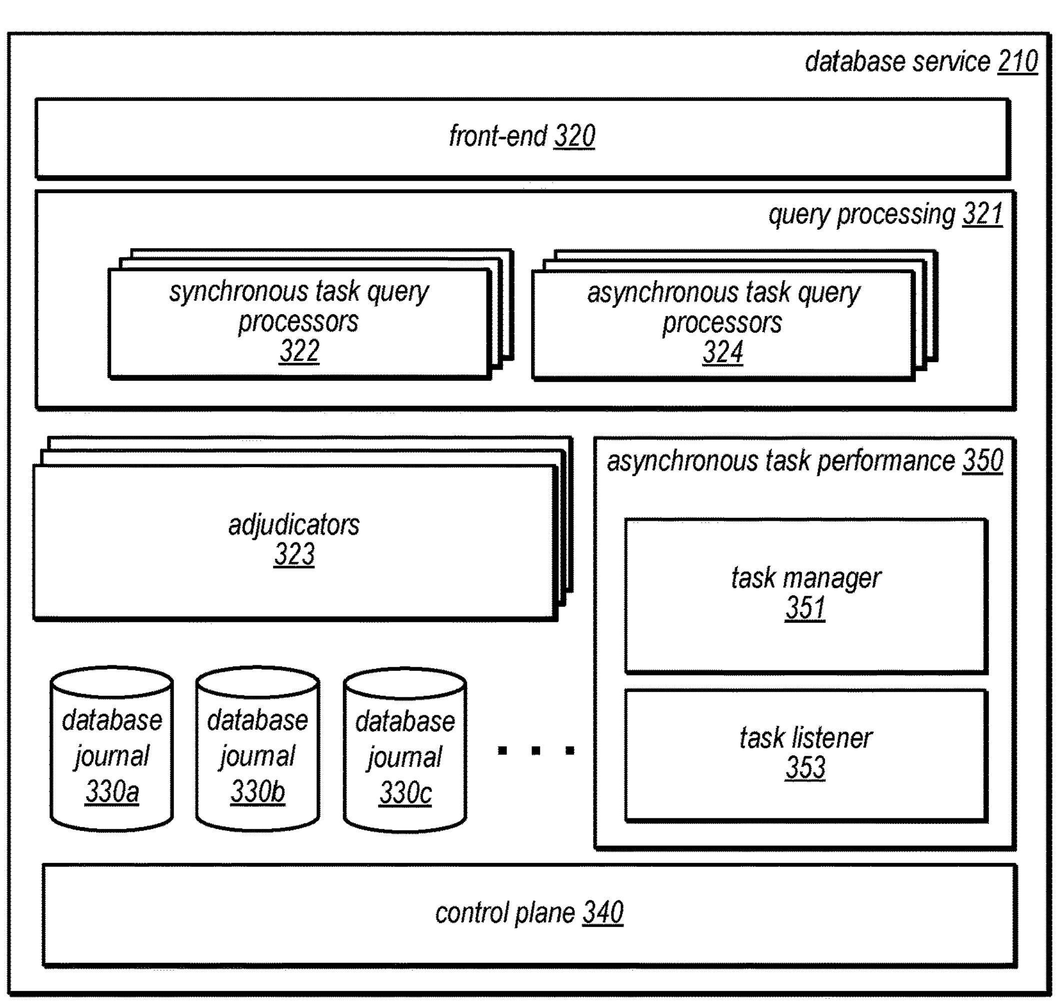
FIG. 3 is a block diagram illustrating various components of a database service and storage service that host databases accessible to database clients, according to some embodiments.
Figure 3:
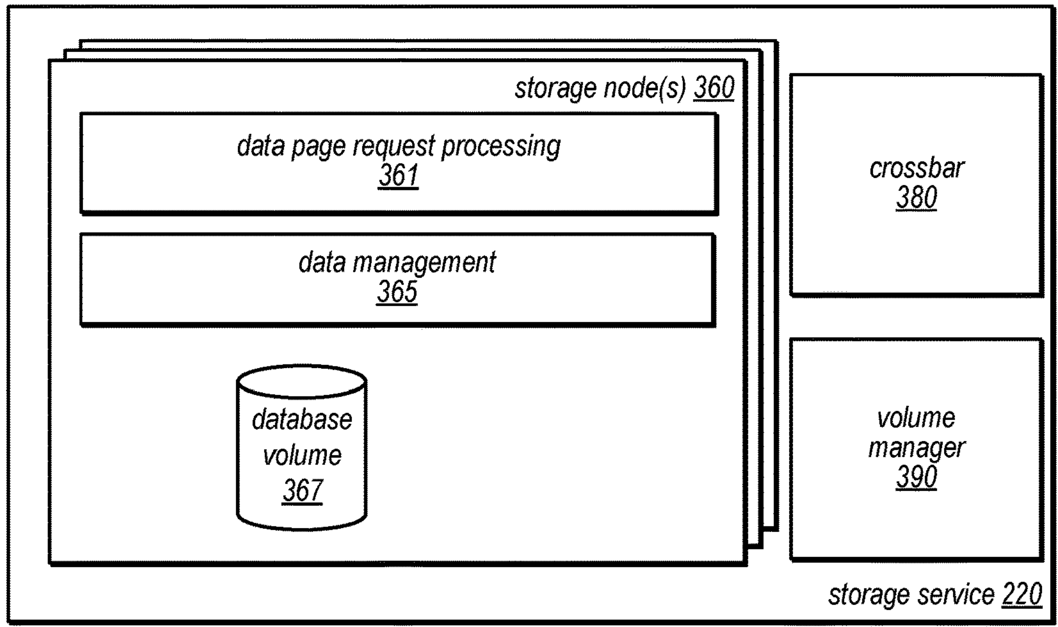

FIG. 3 is a block diagram illustrating various components of a database service and storage service that host databases accessible to database clients, according to some embodiments. Database service 210 (instantiated as database service 210*a* in region 200*a* and 210*b* in region 200*b*) may implement control plane 340 which may manage the creation, provisioning, deletion, or other features of managing a database hosted in database service 210. For example, control plane 340 may monitor the performance of host(s) (e.g., a computing system or device like computing system 1000 discussed below with regard to FIG. 10) for high workloads (e.g., heat) and move or redirect placement of database engine head node instances away from some hosts to avoid overburdening host(s) 310. Control plane 340 may handle various management requests, such as request to create databases, manage databases (e.g., by configuring or modifying performance, such as by enabling a "serverless" or other automated management feature in response to a request which may cause in-place resource scaling to be enabled for that database. Control plane 340 may direct placement of database engine head node instances on host(s) so as to distribute workload across host(s) to avoid failure scenarios, like out-of-memory. In some embodiments, asynchronous task performance 350 may be implemented as part of control plane 340, or separately. Asynchronous task performance 350 may include a task manager and task listener 353 (which may be assigned to respective databases hosted in database service) to perform asynchronous tasks, as discussed in detail below with regard to FIGS. 6-9.

Database service 210 may implement one or more different types of database systems with respective types of query processors for accessing database data as part of the database. For example, database service 210 may implement various types of connection-based (e.g., having established a network connection between a database client and database instance 320) database systems which may, for instance, facilitate the performance of various operations that continue over multiple communications between the database client and the connected database instance 320. In at least some embodiments, database service 210 may be a relational database service that hosts relational databases on behalf of clients.

Database service 210 may implement a fleet of host(s) 310 which may provide, in various embodiments, a multi-tenant configuration so that different database instances, such as database instance 320*a* and 320*b*, can be hosted on the same host 310, but provide access to different databases on behalf of different clients over different connections. In some embodiment hosts(s) 310 may not be multi-tenant.

In various embodiments, host(s) may implement a virtualization technology, such as virtual machine based virtualization or container-based virtualization, wherein database instances 320 may be different respective virtual machines, micro virtual machines (microVMs) which may offer a reduced or light-weight virtual machine implementation that retains use of individual kernels within a microVM, or containers which offer virtualization of an operating system using a shared kernel. Host(s) may implement a virtualization manager, which may support hosting one or multiple separate query processors 321 as different respective VMs, microVMs, or containers. Virtualization manager may support increasing or decreasing resources made available to host(s) to use for other tasks.

Host systems may support various features for accessing a database, such as query processor(s) 321, and adjudicator(s) 323 discussed in detail below with regard to FIGS. 4-5. Query processors 321 may implement agents, interfaces, or other controls according to the respective type of virtualization used to collect and facilitate communication of utilization metrics for in-place scaling, among other supported aspects of virtualization. In at least some embodiments, query processors 321 may implement synchronous task query processors 322 and asynchronous task query processors 324, which may separately execute queries and other tasks to perform synchronous and asynchronous tasks, respectively (as discussed above with regard to FIG. 1 and below with regard to FIGS. 6-9).

In some embodiments, database data for a database of database service 210 may be stored in a separate storage service 220. In some embodiments, storage service 220 may be implemented as to store database data as virtual disk or other persistent storage drives. In other embodiments, embodiments, storage service 220 may store data for databases using log-structured storage. Storage service 220 may implement control or management features, such as volume manager 390, which may control various management tasks or operations for storage node(s) 360 and/or database volumes 367 (e.g., mounting new volumes, instigating backup, etc.). Crossbars 380, as discussed in detail below with regard to FIGS. 4 and 5, may be applied to apply journal records fin database journals 330 in order to update database volumes 367. Crossbars 180 may include index record handling 381, which may identify records that have special handling as records of secondary index builds that are unique.

For example, data may be organized in various logical volumes, segments, and pages for storage on one or more storage nodes 360 of storage service 220. For example, in some embodiments, each database may be represented by a logical volume, and each logical volume may be segmented over a collection of storage nodes 360. Each segment, which may live on a particular one of the storage nodes, may contain a set of contiguous block addresses, in some embodiments. In some embodiments, each segment may store a collection of one or more data pages and a change log (also referred to as a redo log) (e.g., a log of redo log records) for each data page that it stores. Storage nodes 360 may receive redo log records and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the databases is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Logical Sequence Number (LSN)), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, a volume may consist of multiple extents, each made durable through a protection group. In such embodiments, a volume may represent a unit of storage composed of a mutable contiguous sequence of volume extents. Reads and writes that are directed to a volume may be mapped into corresponding reads and writes to the constituent volume extents. In some embodiments, the size of a volume may be changed by adding or removing volume extents from the end of the volume.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes, in some embodiments. In some embodiments, a segment may provide an LSN-type read/write interface for a fixed-size contiguous range of bytes (where the size is defined at creation). In some embodiments, each segment may be identified by a segment UUID (e.g., a universally unique identifier of the segment).

In some embodiments, a page may be a block of storage, generally of fixed size. In some embodiments, each page may be a block of storage (e.g., of virtual memory, disk, or other physical memory) of a size defined by the operating system, and may also be referred to herein by the term "data block". A page may be a set of contiguous sectors, in some embodiments. A page may serve as the unit of allocation in storage devices, as well as the unit in log pages for which there is a header and metadata, in some embodiments. In some embodiments, the term "page" or "storage page" may be a similar block of a size defined by the database configuration, which may typically a multiple of 2, such as 4096, 8192, 16384, or 32768 bytes.

In some embodiments, storage nodes 360 of storage service 220 may perform some database system responsibilities, such as the updating of data pages for a database, and in some instances perform some query processing on data. As illustrated in FIG. 3, storage node(s) 360 may implement data page request processing 361, and data management 365 to implement various ones of these features with regard to the data pages 367 and page log 369 of redo log records among other database data in a database volume stored in log-structured storage service. For example, data management 365 may perform at least a portion of any or all of the following operations: replication (locally, e.g., within the storage node), coalescing of redo logs to generate data pages, snapshots (e.g., creating, restoration, deletion, etc.), clone volume creation, log management (e.g., manipulating log records), crash recovery, and/or space management (e.g., for a segment). Each storage node may also have multiple attached storage devices (e.g., SSDs) on which data blocks may be stored on behalf of clients (e.g., users, client applications, and/or database service subscribers), in some embodiments. Data page request processing 361 may handle requests to return data pages of records from a database volume, and may perform operations to coalesce redo log records or otherwise generate a data pages to be returned responsive to a request.

In at least some embodiments, storage nodes 360 may provide multi-tenant storage so that data stored in part or all of one storage device may be stored for a different database, database user, account, or entity than data stored on the same storage device (or other storage devices) attached to the same storage node. Various access controls and security mechanisms may be implemented, in some embodiments, to ensure that data is not accessed at a storage node except for authorized requests (e.g., for users authorized to access the database, owners of the database, etc.).

In some embodiments, respective database journals, such as database journals 330*a* through 330*d*, may be hosted in database service that store ordered updates to the database (e.g., to a database volume). Adjudicators 323 may responsible for deciding whether transactions or writes can be committed (while following isolation rules), for working with database journal(s) 330*a* through 330*d* to order transactions, and for ensuring that committed data is strongly consistent. In at least some embodiments, adjudicators 323 may implement index write handling 324, which may recognize writes to secondary indexes that are being built, including unique secondary indexes. In such cases, index write handling may not apply certain adjudication techniques, such as optimistic concurrency control, but instead may pass through writes to database journals.

Front-end 320 may implement a proxy, request router or other load balancing feature that routes database requests to one or more query processors 321. For example, front-end 320 may be responsible for authenticating requests to connect to a database at a particular network endpoint and allocating a query processor 321 to the connection (or to a particular request such as a query or transaction). The front-end 320 may maintain the connection (e.g., as a proxy) so that if different query processors are used for different requests to the database, separate connections do not have to be established.

Figure 4:
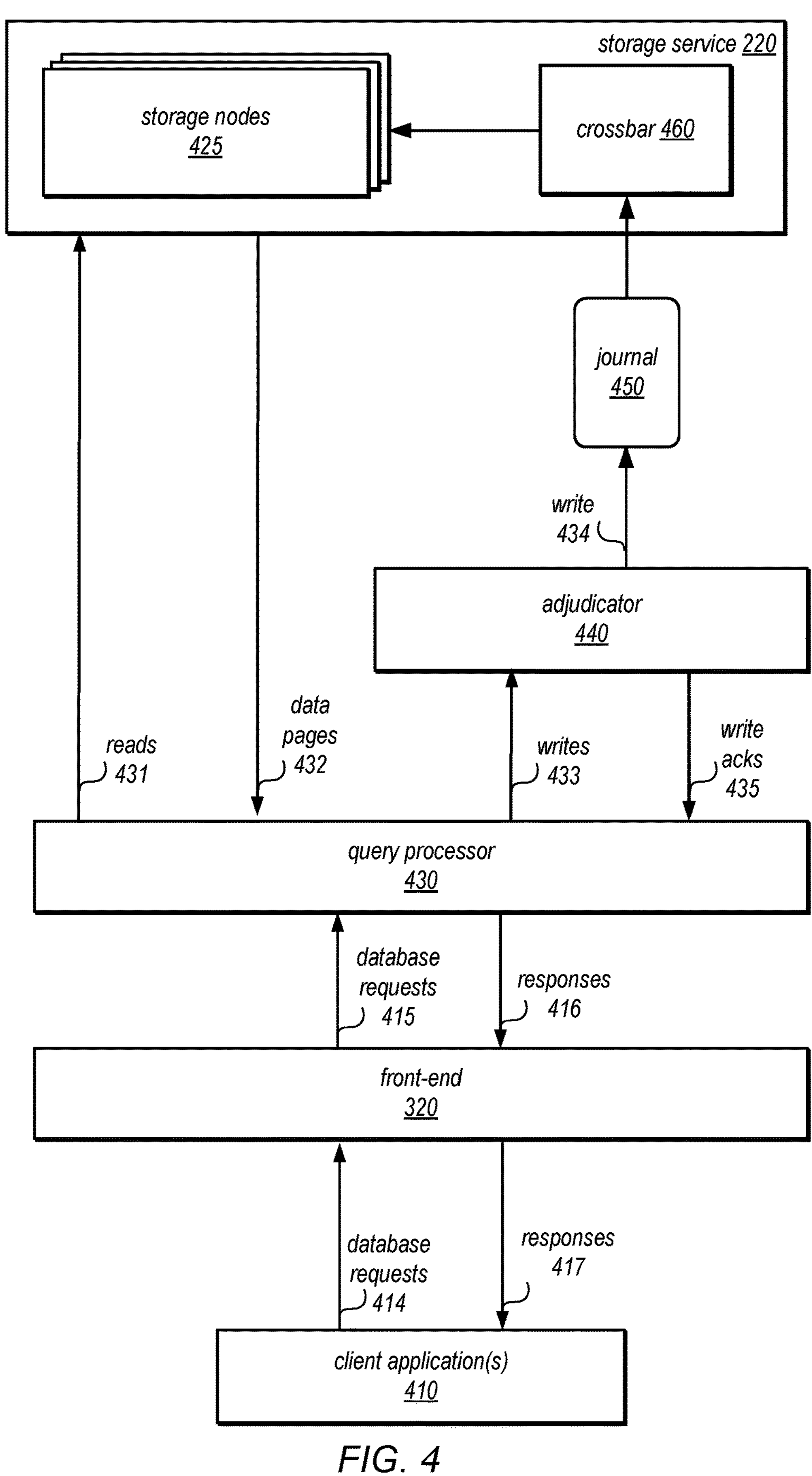
FIG. 4 is a block diagram illustrating the interactions between a database service and separate storage service, according to some embodiments.

FIG. 4 is a block diagram illustrating various interactions to handle database client requests, according to some embodiments. In this example, one or more client application(s) 410 may store data to one or more databases maintained by a database service 210. Client application(s) 410 may submit database requests 414 (e.g., requests that cause reads, such as queries or read-only transactions, or requests that cause writes, such as updates, inserts, deletions, or transactions that include write statements) and receive responses 417 from front-end 320.

Front-end 320 may dispatch database requests 415 to a query processor 430, which may parse the request and interact with different components according to the type of request. For read request, query processor 430 may rely upon a local cache and/or access storage nodes 425 by submitting read requests 431 for data pages, which are returned 432 and used to perform the read. For writes, write requests may be sent to an adjudicator 440, which determine whether a conflict exists and if not, writes 434 to journal 450 and acknowledges the write 435 to query processor 430. Responses 416 may then be sent to front-end 320 for response 417 to client application(s) 410.

As discussed above with regard to FIG. 1, a database may be replicated. In some scenarios this replication may be across regions. FIG. 5 is a block diagram illustrating cross region replication for a database hosted in a database service that implements orchestrating performance of asynchronous database tasks, according to some embodiments. In this illustrated example, multiple query processors 532*a* and 532*b* of one or more database instances may be hosted in respective services in database services 509*a* and 509*b* in region 505*a* and region(s) 505*b* to provides database services to clients that access the databases in the different regions. It should be noted that, while the illustrated example shows two regions, any number of regions may be implemented. As discussed above with regard to FIG. 4, query processors may provide read and write capabilities to the database, utilizing query processor 532*a* and adjudicator 534*a*, in different regions.

In some embodiments, adjudicators 534 may implement protocols to support cross-region transactions. For example, adjudicator 534*a* may communicate with adjudicator 534*b* and/or query processors 532*a* and 532*b* in order to determine whether a given write conflicts or can be committed. Once committed, these changes may be written to journals 534*a* or 534*b* which may ultimately have the changes applied by respective crossbars 550*a* and 550*b* to respective copies of the database volume 540*a* and 540*b* in each region 505*a* and 505*b*.

Figure 5:
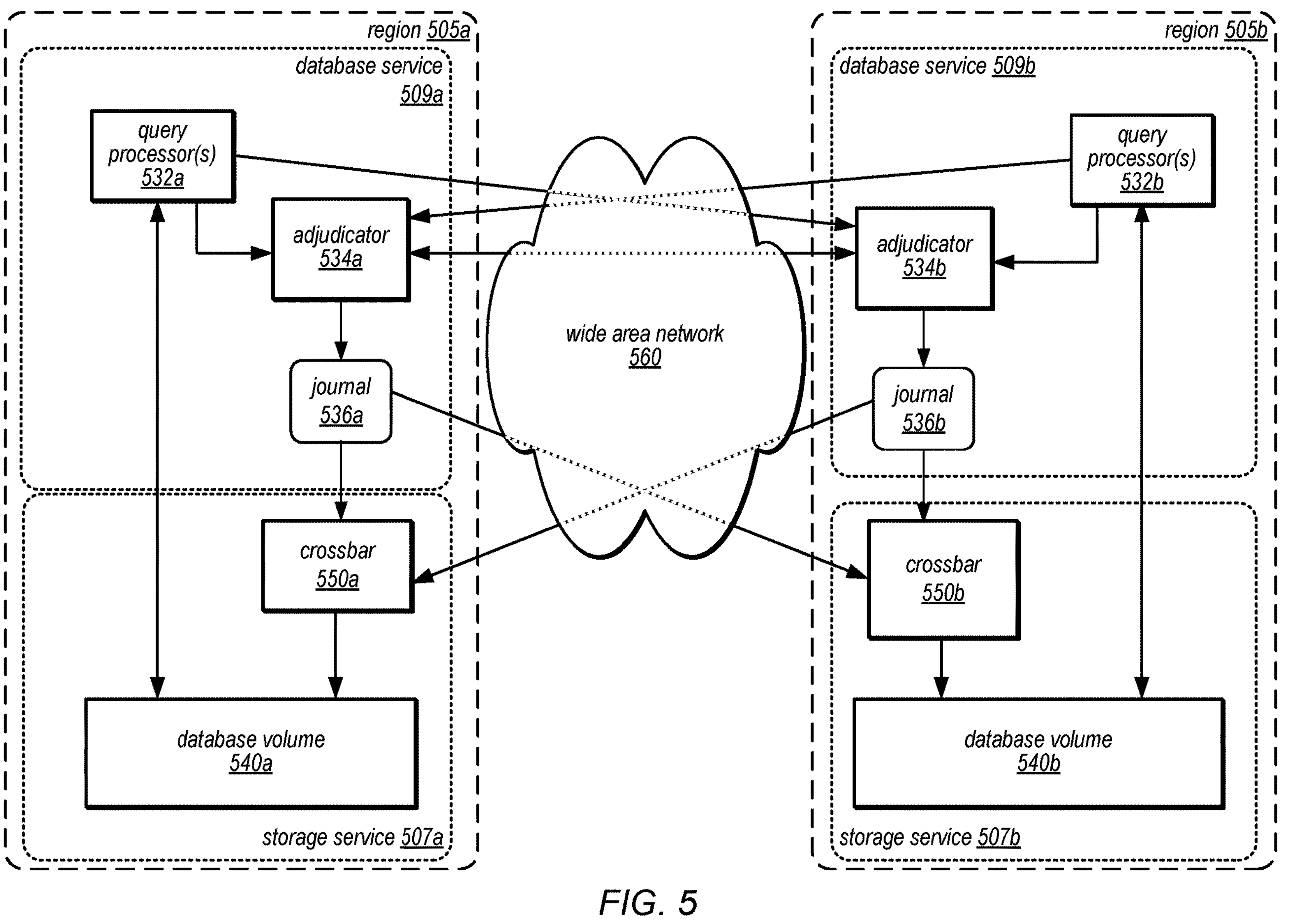
FIG. 5 is a block diagram illustrating cross region replication for a database hosted in a database service that implements orchestrating performance of asynchronous database tasks, according to some embodiments.

As illustrated in FIG. 5, various communications can occur across wide area network 560 between different components (e.g., query processors 532*a* and 532*b*, adjudicators 534*a* and 534*b*, journals 536*a* and 536*b*, and crossbars 550*a* and 550*b*). Replication messages that describe updates to a database may be sent amongst these components according to various types of synchronized replication techniques that may be implemented. Therefore, the techniques discussed above with regard to FIG. 1 (e.g., writes to system tables) may be applied to various ones of the possible replication messages exchanged, either across wide area network 560 or internally within a region 505*a* and 505*b*.

For example, replication messages may include updates that are shared as part of performing writes to system tables to add an asynchronous task for performance. As discussed below with regard to FIGS. 6 and 7, these writes may be detected and used to initiate asynchronous task processing workflows. In some embodiments, writes to system tables for asynchronous tasks may be limited to specific regions (e.g., not replicated to or ignored by regions in which the asynchronous task is not to be performed).

Figure 6:
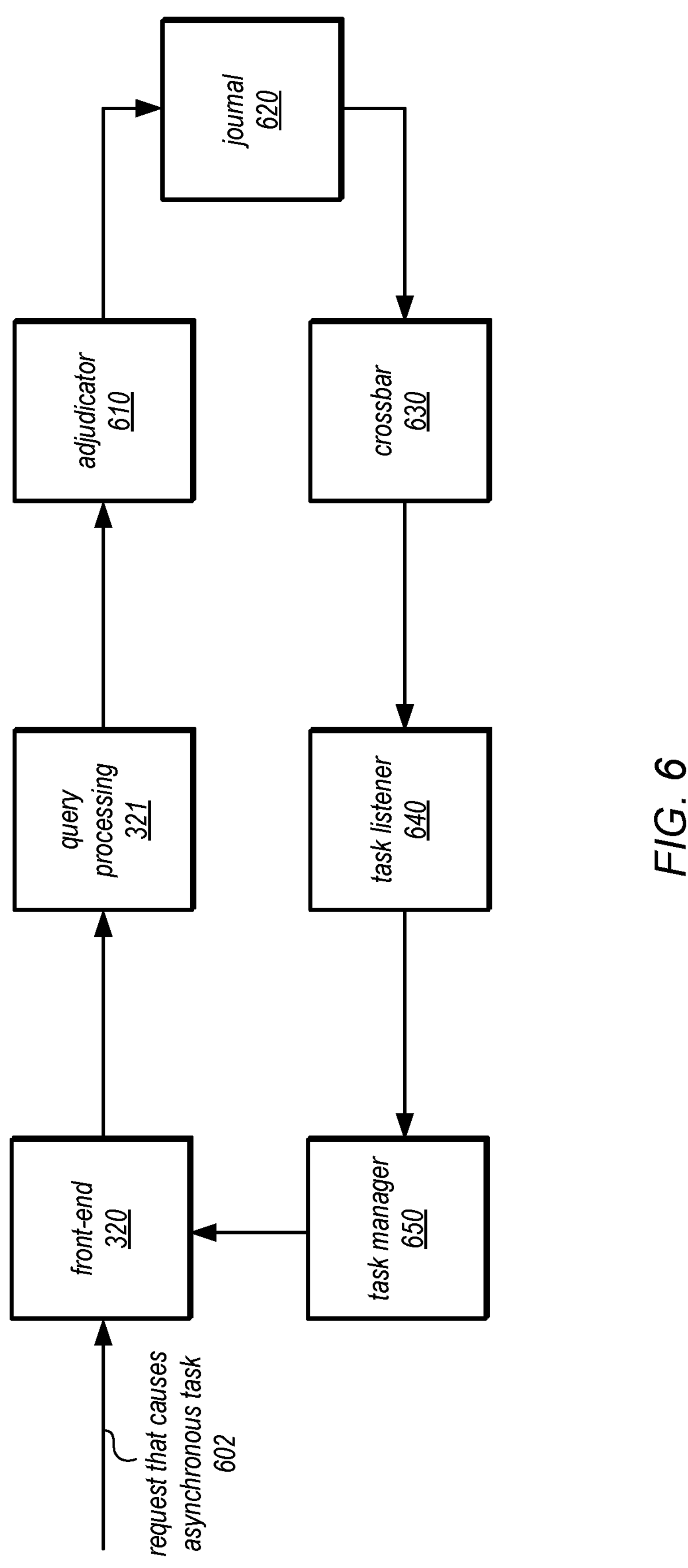
FIG. 6 is a block diagram illustrating interactions between a task listener, task manager, write path for system table writes, according to some embodiments.

FIG. 6 is a block diagram illustrating interactions between a task listener, task manager, write path for system table writes, according to some embodiments. A request that causes an asynchronous tasks 602 may be received at front-end 320. For example, the request may include DDL requests, or long-running DML requests. Front-end 320 may dispatch the request to an initial query processor in query processing 321 that performs synchronous tasks to a database targeted by the request 602. This initially assigned query processor may apply various asynchronous task recognition techniques (e.g., applying recognition rules, criteria, or machine learning models trained to recognize long-running or other tasks that would benefit from asynchronous task performance). Once recognized, assigned query processor may write an asynchronous task entry into a system table for asynchronous tasks via adjudicator, 610, journal 620, and crossbar 630 (as discussed in detail above).

Task listener 640 may register for and receive writes to the system table from crossbar 630. Then, task listener 640 may provide an indication of the asynchronous task to task manager 650, which may interact with front-end to coordinate performance of the asynchronous task, as discussed in detail below. Some writes received by task listener 640 may be specific to a particular region (e.g., written to a different region but replicated according to the techniques discussed above with regard to FIG. 5). A determination may be made as to whether the task is to be performed in the region of the task listener (and if not, then the write may be ignored). Because the state of tasks may be stored in system tables, detected by task listeners 640 and orchestrated by task manager 650, the performance of asynchronous tasks may be resilient in the face of failures, such as failures of task listener 640 and task manager 650. For example, because the task is entered into a system table, a newly restarted task listener 640 can determine whether or not an asynchronous task has begun performance coordinated by task manager 650. Similarly, task manager 650 can obtain task information (e.g., via task listener 640 upon restart or return from failure). The use of system tables to store the state of tasks and having a separate coordination of their performance (instead of at a query processor performing synchronous tasks) may allow for asynchronous tasks to be paused or cancelled (e.g., via updates to the system table entr(ies) for the asynchronous task).

Figure 7:
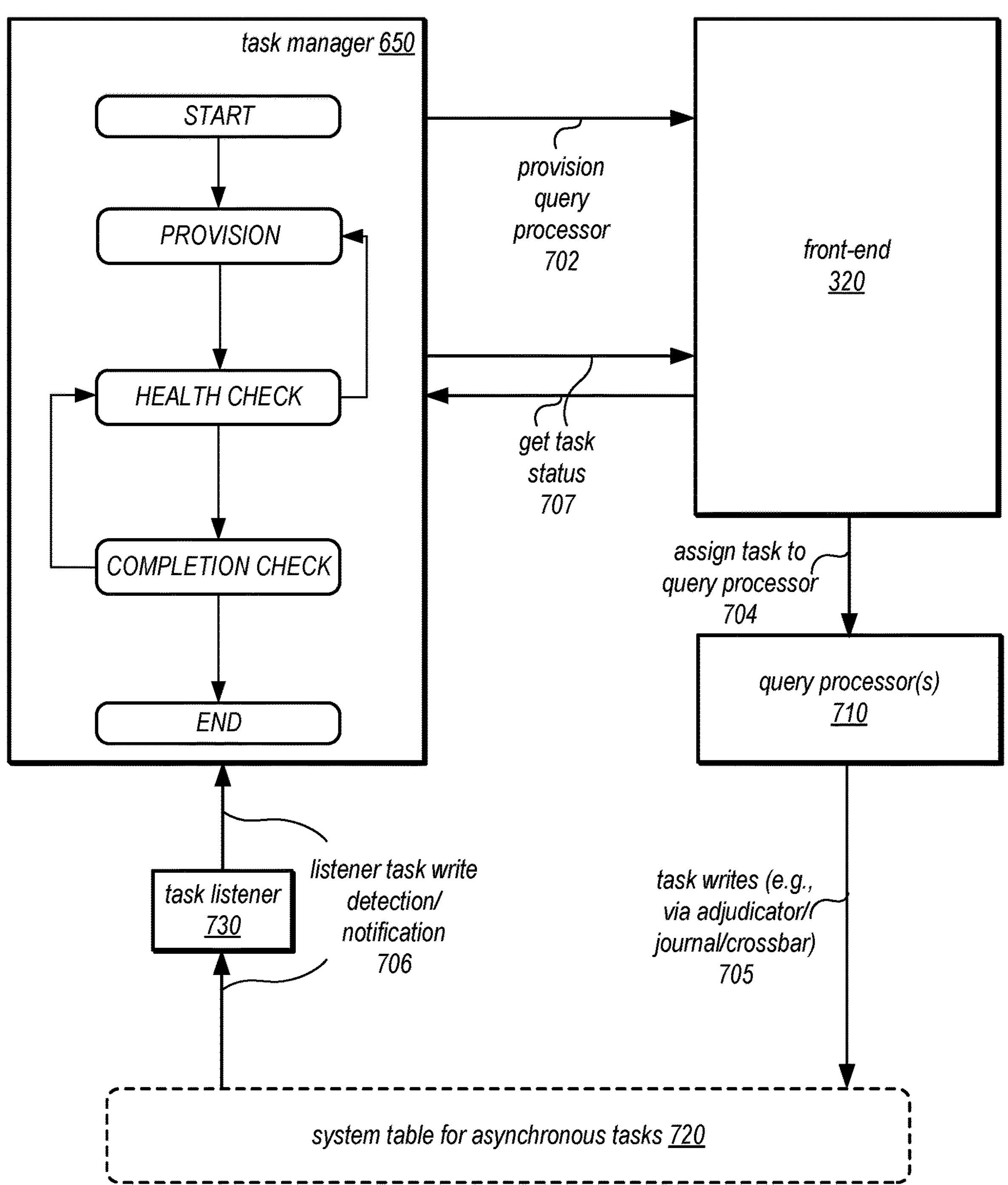
FIG. 7 is a block diagram illustrating interactions for asynchronous task management, according to some embodiments.

FIG. 7 is a block diagram illustrating interactions for asynchronous task management, according to some embodiments. Task manager 650 may execute or perform a coordination workflow that will access system table for asynchronous tasks 720 in order to obtain an asynchronous tasks to perform. The workflow may start by provisioning a query processor, as indicated at 702. Front-end 320 may be responsible for selecting a query processor to perform the asynchronous task. As indicated at 704, query processor 710 may be assigned the task. Query processor 710 may access system table for asynchronous tasks 720, in order to obtain task information, including the information to identify the workflow for the specific asynchronous tasks and being performance. As discussed in detail below with regard to FIG. 9, the task could be divided into multiple child tasks, which could be written to the system table (and following the data flow illustrated in FIG. 6) be indicated to task manager 650 (to perform further provisioning). In this way, tasks can be parallelized in order to be performed more efficiently and with more consistency across similar tasks. Like the discussion above with regard to FIG. 6, the use of the techniques depicted in FIGS. 6 and 7 can provide greater resiliency in the face of failures even for asynchronous tasks that have been divided and performed in parallel or as multiple child tasks (which may not necessarily be performed in parallel, in some embodiments).

Periodically, task manager 650 may perform health checks and completion checks, getting task status 706 from front-end 320. If a task has failed health check, a new query processor may be provisioned. If the task is completed, then the workflow may end.

Figure 8:
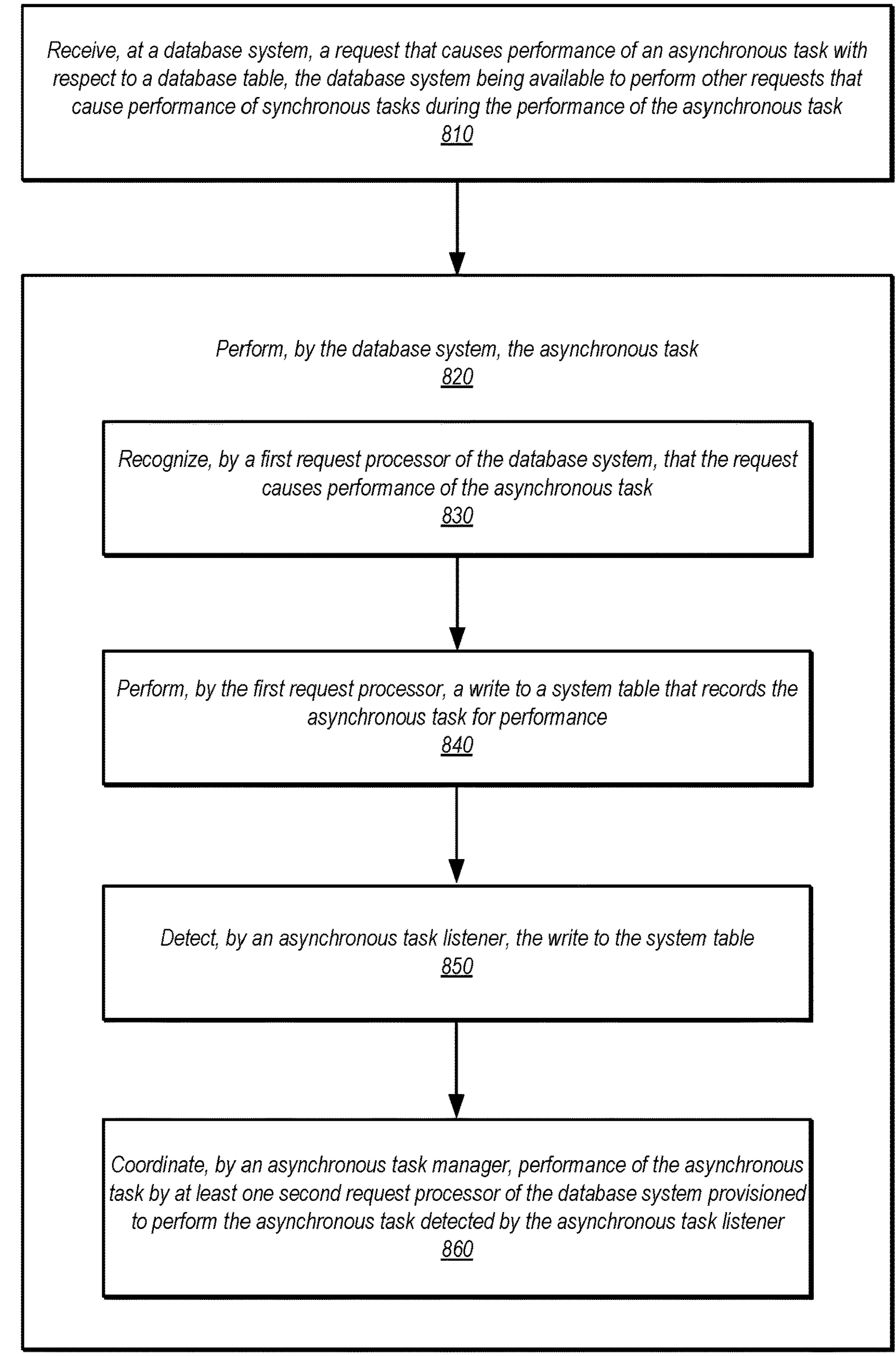
FIG. 8 is a high-level flowchart illustrating various methods and techniques to implement orchestrating performance of asynchronous database tasks, according to some embodiments.

The database service and storage service discussed in FIGS. 2 through 8, provide examples of a system that may implement minimizing connection loss when changing database query processor versions. However, various other types of distributed database systems (as discussed above with regard to FIG. 1) may implement these techniques. FIG. 8 is a high-level flowchart illustrating various methods and techniques to implement orchestrating performance of asynchronous database tasks, according to some embodiments. Various different systems and devices of a distributed database system may implement the various methods and techniques described below, either singly or working together. For example, a control plane component of a distributed database system and/or a database instance may implement the various methods. Alternatively, a combination of different systems and devices may implement these techniques. Therefore, the above examples and or any other systems or devices referenced as performing the illustrated method, are not intended to be limiting as to other different components, modules, systems, or configurations of systems and devices.

As indicated at 810, a request may be received at a database system that causes performance of an asynchronous task with respect to a database table, in some embodiments. The database system may still be available to perform other requests that cause performance of synchronous tasks during the performance of the asynchronous task, in some embodiments. The database system may perform the asynchronous task, as indicated at 820, in some embodiments. For example, as indicated at 830, a first request processor of the database system, may recognize that the request causes performance of the asynchronous task, in some embodiments. Recognition may include identifying a specific parameter, flag, or other indication in the request that specifies the request be performed asynchronously (or from a particular source/client application). In some embodiments, recognition may include applying rules, criteria, or machine learning models to recognize the request for performance of an asynchronous task.

As indicated at 840, a write to a system table that records the asynchronous task for performance may be performed by the first request processor (e.g., similar to request processor 120/query processors 710 discussed above), in some embodiments. In some embodiments, the write may be a new row into a table. In some embodiments, the write may include generating and storing a directed acyclical graph (DAG) which provides a topographical ordering of operations to perform the asynchronous task. For example, the database system may use a query processor that performs initial processing the request using a parser, query/request planner, optimizer, and/or various other components that may generate a tree or other graph of operations to complete a task. In some embodiments, the DAG may be stored separate from the system table.

As indicated at 850, an asynchronous task listener may detect the write to the system table, in some embodiments. For example, the task listener may be registered to receive updates for a specific table, the system table from a crossbar or similar component (as discussed above with regard to FIGS. 3-6) or may periodically, poll, read, or otherwise request system table data in order to detect the write. As indicated at 860, the asynchronous task may be performed by at least one second request processor of the database system provisioned to perform the asynchronous task detected by the asynchronous task listener by an asynchronous task manager as discussed above. As discussed in detail below with regard to FIG. 9, the task may be divided and performed by multiple different request processors (e.g., similar to request processors 160/query processors 710).

Figure 9:
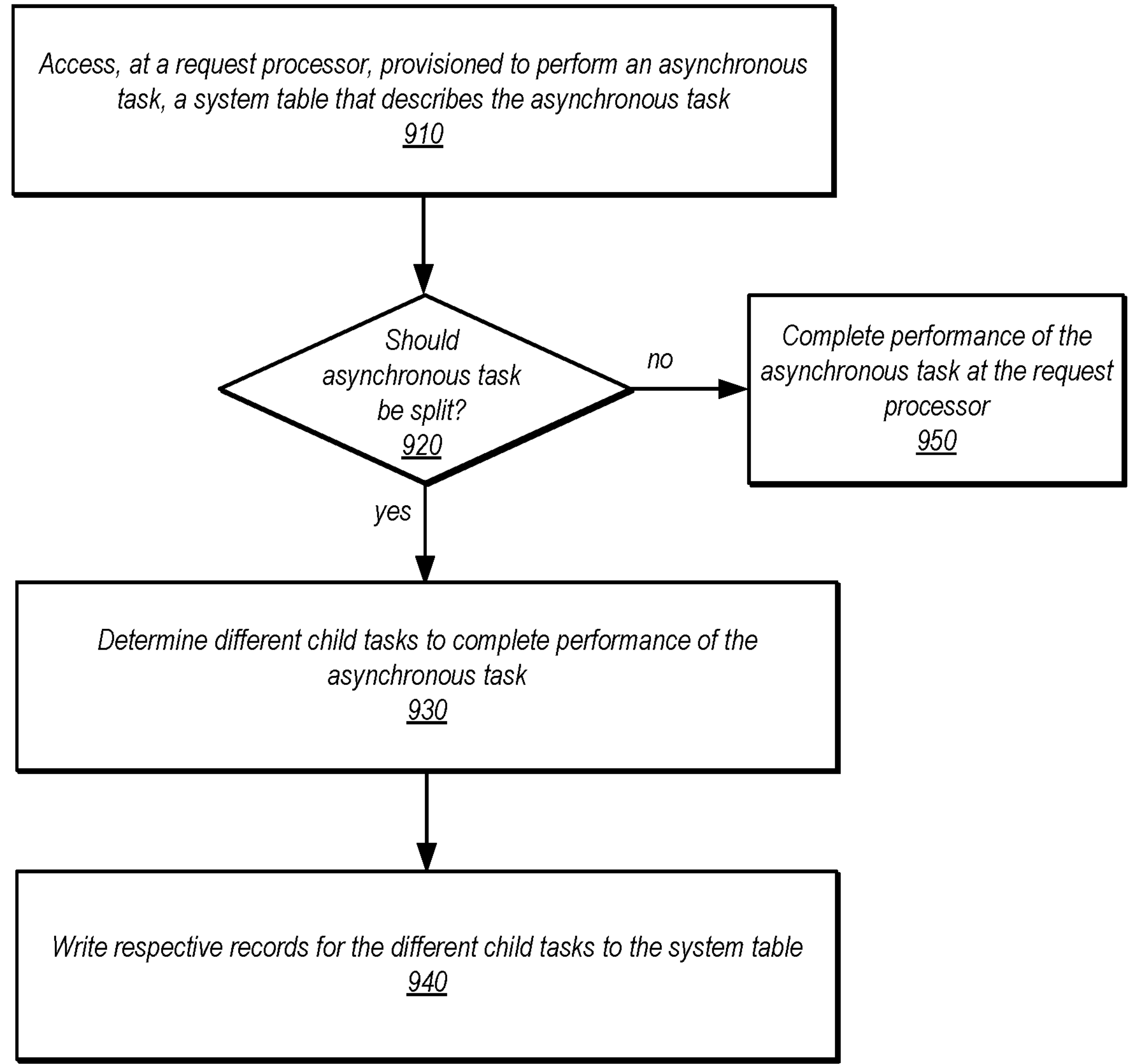
FIG. 9 is a high-level flowchart illustrating various methods and techniques to implement dividing an asynchronous task into different child asynchronous tasks, according to some embodiments.

FIG. 9 is a high-level flowchart illustrating various methods and techniques to implement dividing an asynchronous task into different child asynchronous tasks, according to some embodiments. As indicated at 910, a request processor that is provisioned to perform an asynchronous task may access a system table that describes the asynchronous task, in some embodiments. For example, the request processor may have been assigned to perform the asynchronous task by a front-end or an orchestration manager directly.

As indicated at 920, a determination may be made as to whether the asynchronous task should be split, in some embodiments. The request processor may apply rules, criteria, or machine learning models to recognize the request for performance of an asynchronous task. In some embodiments, an execution plan, such as may be specified in a DAG, may be generated by the request processor (or an earlier request processor), which may indicate division of the task. If no split is determined, performance of the asynchronous tasks may be completed at the request processor, in some embodiments, as indicated at 950.

If splits are determined, as indicated by the positive exit from 920, different child tasks may be determined to complete performance of the asynchronous task, as indicated at 930. As indicated at 940, respective records for the different child tasks may be written to the system table, in some embodiments. In some embodiments, the request processor may wait and/or check for completion of the child tasks in order to mark the asynchronous task as complete. In some embodiments, the request processor may finish processing (e.g., to be made available for other work), allowing an other provisioned request processor for a child task to determine and mark the asynchronous task as complete.

The methods described herein may in various embodiments be implemented by any combination of hardware and software. For example, in one embodiment, the methods may be implemented on or across one or more computer systems (e.g., a computer system as in FIG. 10) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 10:
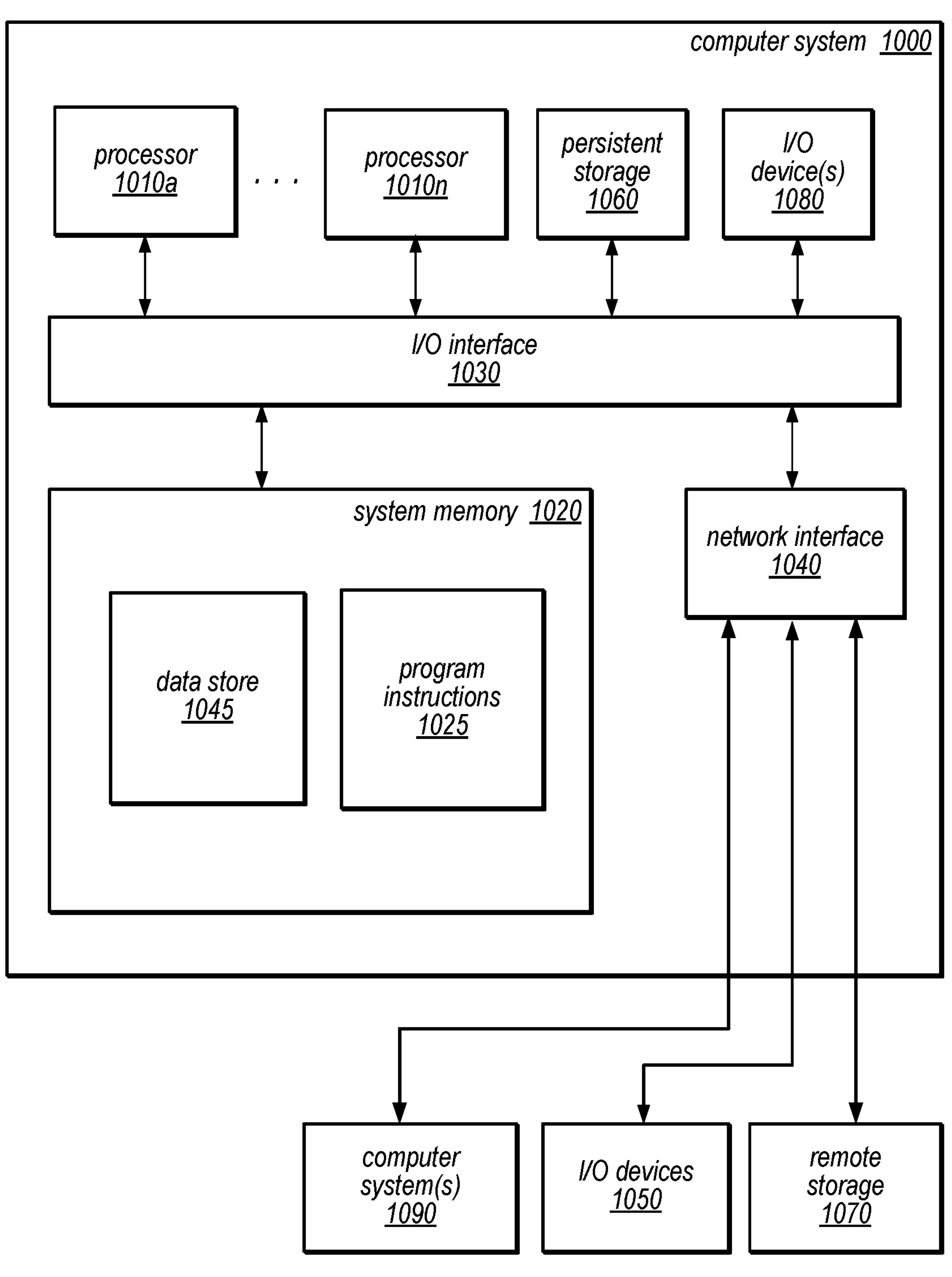
FIG. 10 is a block diagram illustrating an example computer system, according to various embodiments.

FIG. 10 is a block diagram illustrating an example computer system, according to various embodiments. For example, computer system 1000 may implement synchronous database replication using erasure coding, in various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that may store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems 1090 (which may implement one or more storage system server nodes, primary nodes, read-only node nodes, and/or clients of the database systems described herein), for example. In addition, network interface 1040 may allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:

a plurality of computing devices, respectively comprising at least one processor and a memory, that implement a multi-tenant, database service;

wherein the database service comprises a first query processor, an asynchronous task listener, and an asynchronous task manager;

wherein the first query processor is configured to:

receive, from a client of the database service, a request that instructs the database service to execute an asynchronous task with respect to a database table, wherein the first query processor is assigned to execute synchronous tasks received from the client or a different client with respect to the database table; and write to a system table to record the asynchronous task;

wherein the asynchronous task listener is configured to:

detect the write to the system table; and send a notification of the write to the asynchronous task manager; and wherein the asynchronous task manager is configured to:

provision at least one second request query processor of the database service provisioned to execute the asynchronous task; and coordinate execution of the asynchronous task at the at least one second query processor.

2. The system of claim 1, wherein the asynchronous task manager is further configured to periodically check whether that the at least one second request processor is healthy.

3. The system of claim 1, wherein execution of the task by the at least one second processor includes:

dividing the asynchronous task into a number of different child tasks; and respectively writing the different child tasks into the system table.

4. The system of claim 1, wherein the first request processor stores a directed acyclical graph of operations to perform the asynchronous task in the system table and wherein the directed acyclical graph is used by the asynchronous task manager to order execution of the asynchronous task.

5. A method, comprising:

receiving, at a query processor of a database system from a client of the database system, request that instructs the database system to execute an asynchronous task with respect to a database table, wherein the query processor of the database system is available to execute other requests that instruct synchronous tasks during the execution of the asynchronous task received from the client or a different client of the database system;

executing, by the database system, the asynchronous task, comprising:

detecting, by a first request processor of the database system, that the request instructs the database system to execute the asynchronous task;

writing, by the first request processor, to a system table to record the asynchronous task;

detecting, by an asynchronous task listener, the write to the system table; and coordinating, by an asynchronous task manager, execution of the asynchronous task by at least one second request processor of the database system provisioned to execute the asynchronous task detected by the asynchronous task listener.

6. The method of claim 5, wherein the request is a Data Definition Language (DDL) request.

7. The method of claim 5, wherein the request is a Data Manipulation Language (DML) request that exceed a running time threshold.

8. The method of claim 5, further comprising periodically checking whether that the at least one second request processor is healthy.

9. The method of claim 8, wherein at least one of the health checks determines that one of the at least one second request processors is not healthy and wherein the method further comprising provisioning another request processor to continue execution of the asynchronous task.

10. The method of claim 5, wherein writing the asynchronous task to the system table comprises submitting a write request to an adjudicator that determines to commit the write to a journal from which a crossbar provides the write to the asynchronous task listener.

11. The method of claim 5, wherein execution of the asynchronous task by the at least one second processor comprises:

dividing the asynchronous task into a number of different child tasks; and respectively writing the different child tasks into the system table.

12. The method of claim 5, wherein the first request processor stores a directed acyclical graph of operations to execute the asynchronous task in the system table, wherein the directed acyclical graph is used by the asynchronous task manager to order execution of the asynchronous task.

13. The method of claim 5, wherein the database system is a database service implemented as part of a provider network that replicates the system table across different regions of the provider network.

14. One or more non-transitory, computer-readable storage media, storing program instructions that when executed on or across one or more computing devices cause the one or more computing devices to implement:

executing an asynchronous task that is instructed by a client of a database system in a request received at a query processor of the database system and is performed with respect to a database table, wherein the query processor of the database system is available to execute other requests that instruct synchronous tasks during the execution of the asynchronous task received from the client or another client of the database system, and wherein, in executing the asynchronous task, the program instructions cause the one or more computing devices to implement:

receiving, from an asynchronous task listener, an indication of a write to a system table by a first request processor when the first request processor recognized that the request instructs the asynchronous task; and coordinating execution of the asynchronous task by at least one second request processor of the database system provisioned to execute the asynchronous task detected by the asynchronous task listener.

15. The one or more non-transitory, computer-readable storage media of claim 14, storing further program instructions that when executed by the one or more computing devices cause the one or more computing devices to further implement periodically checking whether that the at least one second request processor is healthy.

16. The one or more non-transitory, computer-readable storage media of claim 14, wherein execution of the asynchronous task by the at least one second processor comprises:

dividing the asynchronous task into a number of different child tasks; and respectively writing the different child tasks into the system table.

17. The one or more non-transitory, computer-readable storage media of claim 14, wherein the first request processor stores a directed acyclical graph of operations to execute the asynchronous task in the system table and wherein the directed acyclical graph is used by the asynchronous task manager to order execution of the asynchronous task.

18. The one or more non-transitory, computer-readable storage media of claim 14, wherein the request is a Data Manipulation Language (DML) request that exceeds a running time threshold.

19. The one or more non-transitory, computer-readable storage media of claim 14, wherein the request is a Data Definition Language (DDL) request.

20. The one or more non-transitory, computer-readable storage media of claim 14, wherein the database system is a database service implemented as part of a provider network that replicates the system table across different regions of the provider network.

* * * * *